United States Patent [19]
Yea

[11] Patent Number: 5,463,257
[45] Date of Patent: Oct. 31, 1995

[54] WIND POWER MACHINE

[76] Inventor: Ton A. Yea, 3 F, No. 27, Tzyh-Chyang Street, Tuu-Cheng City, Taipei Hsien, Taiwan

[21] Appl. No.: 396,101

[22] Filed: Feb. 28, 1995

Related U.S. Application Data

[63] Continuation of Ser. No. 273,173, Jul. 26, 1994, abandoned, which is a continuation of Ser. No. 155,886, Nov. 23, 1993, abandoned.

[51] Int. Cl.$^6$ .................................. F03D 7/02; F03D 3/02
[52] U.S. Cl. ..................... 290/55; 290/44; 415/4.1; 415/164; 416/235
[58] Field of Search ................ 290/44, 55; 415/4.1, 415/164; 416/235

[56] References Cited

U.S. PATENT DOCUMENTS

| | | | |
|---|---|---|---|
| 204,481 | 6/1878 | Cleland | 415/164 |
| 574,290 | 12/1896 | Twiss | 415/164 |
| 1,861,065 | 5/1932 | Poot | 416/235 |
| 2,238,749 | 4/1941 | Peltier | 416/235 |
| 4,070,131 | 1/1978 | Yen | 290/55 |
| 4,935,639 | 6/1990 | Yeh | 290/55 |

Primary Examiner—Steven L. Stephan
Assistant Examiner—Robert Lloyd Hoover
Attorney, Agent, or Firm—Lowe, Price, LeBlanc & Becker

[57] ABSTRACT

A wind power machine that generates power or performs work by using the force of the wind. The wind power machine is more efficient in its rotational operation and can used in power generation, water pumping as well as any other application in creating wind power. It comprises an outer tower and a rotatable inner tower in which the outer tower is fixed and provided with flow guiding plates. The air flow is efficiently guided in and out of the tower through the flow guiding plates. The inner tower is movably mounted inside the outer tower, it is rotated by the air flow drawn in from the outside so that its supporting shaft can generate a twisting momentum for power generation. When a motor is used to rotate the inner tower, then the inner tower works as a circulating fan. This is characterized in that the angles of the flow guiding plates can be adjusted synchronously, moreover, V notches are provided on the flow guiding plates as well as the fan blades. The V blades function to guide the air flow and increase its pressure. By using the principle of magnetic repulsion from magnets having the same polarity, the inner tower can be movably mounted in a semi-floating state inside the outer tower. All of these serve to increase the efficiency of the rotation and enhance the application of wind power.

5 Claims, 7 Drawing Sheets

1
WIND POWER MACHINE

This application is a continuation of application Ser. No. 08/273,173 filed Jul. 26, 1994 now abandoned which is a continuation of application Ser. No. 08/155,886, filed Nov. 23, 1993 now abandoned.

BACKGROUND OF THE INVENTION (a) Field of the Invention

The present invention relates to a wind power machine that generates power or perform work by using the force of the wind. More specifically, the present invention relates to a wind machine which consists of a fixed outer tower and a rotatable inner tower together with the associated flow guiding plates and fan blades through which the rotational efficiency of the wind machine can be improved.

(b) Description of the Prior Art

Wind power machines, or windmills, were used in Holland to drain the polders after the dikes were built; the largest of their time, they became and remain a symbol of the Netherlands. In fact, those windmills are horizontal-axis machines, and they are not efficient when the wind changes direction. Moreover, the sizes of the fan blades are directly proportional to the efficiency of the wind machine, making the efficiency limited and the application to be restricted. Hence the vertical-axis wind machines are provided from which the multidirectional wind flow can be drawn into the machine to deliver a higher output. This type of wind machine is therefore widely used in power generation.

The Inventor, driven by the interest in the application of wind power, has spent a lot of effort in the research of wind power technology. U.S. Pat. No. 4,935,639 pertaining to a rotational power generating tower was granted to the Inventor. The structure of that invention is hereby shown in FIG. 1 for reference. After a continuous testing and improvement for a few years, an improved wind power machine is invented. The new invention mainly overcomes the drawbacks of the prior art and improvement are made which are shown below:

(1) The conventional power generating tower has a heater 400 installed on its bottom and uses solar power as auxiliary power. Its surface to be heated must be large enough so as to increase area of heat absorption. This large-size tower is unfitted for a lot of applications.

(2) The structure of the fan blade of the inner tower is too complicated and is too close to the port 402. Theoretically speaking, the warm air flow or wind induced from the heat absorbing plate 404 cannot enter the inside of the inner tower to generate the whirlwind. This is because of a centrifugal force generated from the rotation of the inner tower. This centrifugal force is in an opposite direction from the direction of the wind. No space is reserved for the wind to be drawn in for rotation. Therefore, this structure is not efficient.

(3). The heat absorbing plate 404 in the conventional power generating tower is inclined at a fixed angle. It is not adjustable based on the direction or the speed of the wind. A high-velocity gust of wind such as the one in a typhoon season can possibly cause damage to the fan blades or the overall structure.

(4) The fan blades 406 in the inner tower of the conventional power generating tower are complicated in structure and there are too many blades. The rotational efficiency is low due to the heavy weight and the cost is high too.

As mentioned in one of the paragraph above, the wind power machine according to the present invention is derived and improved from the passive wind power machine of the prior art. However, it can be deduced by the Inventor that the present invention can also be rotated by a dynamic power so as to generate the wind power.

SUMMARY OF THE INVENTION

The main object according to the present invention is to provide a wind power machine in which both the flow guiding plate for guiding the air flow and the fan blades for rotating the air have simple structures but the design complies with the principles of fluid mechanics. Each of the plates and the blades is provided with a V notch for either guiding the air flow or increasing the pressure. Thus the rotational wind power is greatly enhanced without the need of auxiliary dynamic power.

Another object according to the present invention is to provide a wind power machine in which the flow guiding plates on the side of the outer tower are designed to be adjustable for cooperating with the wind speed and direction. Thus the wind can be coming from any direction and the maximum wind flow can be drawn into the machine for power generating. The overall structure of the wind power machine is not affected by the new design of the flow guiding plates.

A further object according to the present invention is to provide a wind power machine in which the volume is not restricted.

Still another object according to the present invention is to provide a wind power machine in which the inner tower can be rotated by a dynamic force so as to produce a tangential wind force.

BRIEF DESCRIPTION OF THE DRAWINGS

The drawings disclose an illustrative embodiment of the present invention which serves to exemplify the various advantages and objects hereof, and are as follows.

DETAILED DESCRIPTION OF THE PREFERRED EMBODIMENT

Figure 4A:
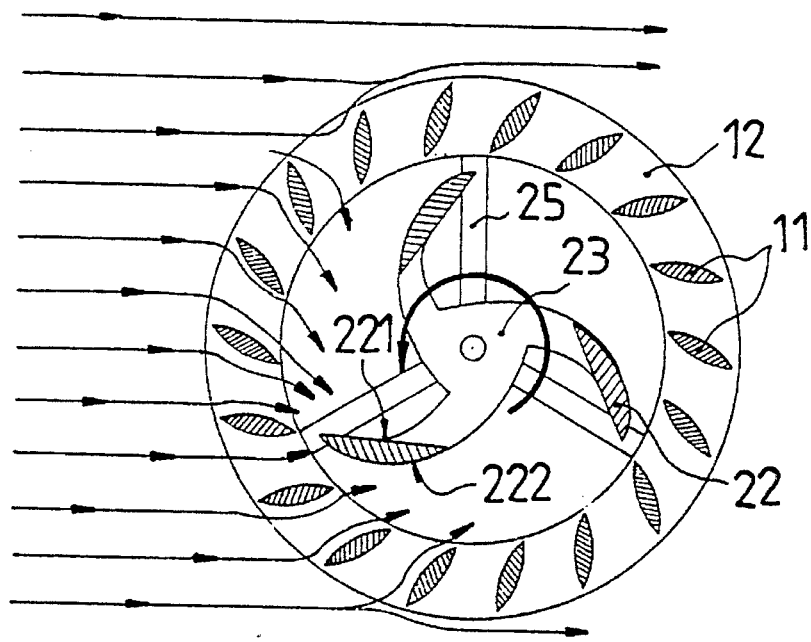
FIGS. 4A and 4B are respectively cross-sectional views showing the flow guiding plates which are adjusted at different angles to draw the air flow, the views shown are taken along line 4—4 of FIG. 3.
Figure 4B:
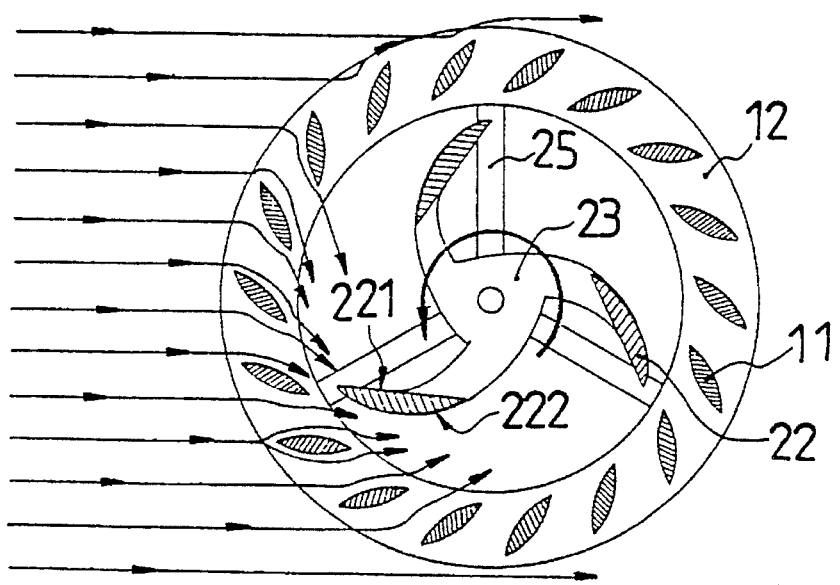

The wind power machine according to the present invention is hereby first described by an application in power generation. It can be seen in FIG. 2 that the wind power machine mainly consists of an outer tower (1) and a rotatable inner tower (2). The side of the outer tower (1) is provided and surrounded with a plurality flow guiding plates (11). These flow guiding plates (11) are installed between a top plate (12) and a bottom plate (13) of the outer tower (1). Some of the flow guiding plates (11) are fixed in position for supporting the weight of the top plate (12). The rest of the flow guiding plates (11) are arranged to be freely movable and can be adjusted according to the direction of the air flow. In order to synchronize the turning during the adjustment, each of the movable flow guiding plates (11) is provided with a chain wheel (14) connected in the axial direction and extending beyond the bottom plate (13). A chain (15) is attached to the external side of the chain wheels (14). By such configuration, a control wheel (16) is connected to the chain (15) so that the flow guiding plates (11) can be turned synchronously. The turning of the control wheel (16) is based on the measurements from an air flow directional device (3), wind speed device (4) or information from Weather forecast. For example, when the wind intensity measured by the wind speed device (4) is exceeding the safety limit of the structure, or when the weather forecast indicates that a typhoon is coming, the flow guiding plates (11) can thereby be adjusted accordingly so that the air flow that is drawn inside the outer tower will not be too strong, and cause damage to the inner tower (2). The effects of the positions of the flow guiding plates (11) to the air flow are shown in FIGS. 4A and 4B. Since the flow guiding plates (11) can be adjusted at different angles, the air flow induced is also moving at a different angle. This air flow is a significant factor in governing the rotation of the inner tower (2). An appropriate angle of the flow guiding plates can maximize the efficiency of the air flow. Due to the complication, it is unnecessary to analyze the air flow based on the theory of fluid mechanics. However, the simplest way is to observe the torque provided by the power generation during the rotation. The most appropriate angle of the flow guiding plates (11) can be obtained when the power generated is maximum. Similarly, when facing the super strong wind, the flow guiding plates (11) are adjusted so that the wind flow into the rotatable inner tower (2) will be able to maintain a stable operation. Moreover, the unidirectional wind in the figure can also be coming from a different direction and the tangential effect shall be the same, i.e. the wind power machine according to the present invention will not be affected by the direction of the wind.

Please again refer to FIG. 2C, the above description indicates that the wind is responsible for the rotation of the inner tower (2). The rotation generates the twisting moment required for the application. Therefore, a supporting shaft (21) must be provided for the twisting moment. The supporting shaft (21), together with a plurality of fan blades (22) are held in place by a top clamping plate (23) and a bottom clamping plate (24). The supporting shaft (21) is then inserted into a bearing (251) of the bracket (25) so that the bracket (25) can be fixed with the outer tower (1). The bottom clamping plate (24) on the lower portion of the supporting shaft (21) is positioned next to the bottom plate (13) inside the outer tower (1). A pair of magnetic rings (5) having the same polarity are provided facing each other between these two parts such that the rotatable inner tower (2) is in a semi-floating state, as is shown in FIG. 3. This allows a frictionless and smooth rotation. Since the fan blades (22) must be able to withstand the air flow in the tangent direction from the outer tower (1), therefore, the fan blade (22) is designed to have a flat surface (221) to face the wind and a curved surface (222) to discharge the wind, as is shown in FIGS. 4A and 4B. Hence the tangential air flow induced from the outer tower (1) is able to drive the flat surface (221) into motion so as to rotate the inner tower and generates the whirlwind. However, the curved surface (222) on the other side generates a corresponding resistance during the rotation. Therefore, it fabricated to have an arcuate shaped surface with a lower coefficient of resistance for higher efficiency. This is an advantage of the fan blade (22). Moreover, the cooperation of the fan blade (22) and the semi-floating rotatable inner tower (2) gives the wind power machine according to the present invention a noiseless operation.

Figure 1B:
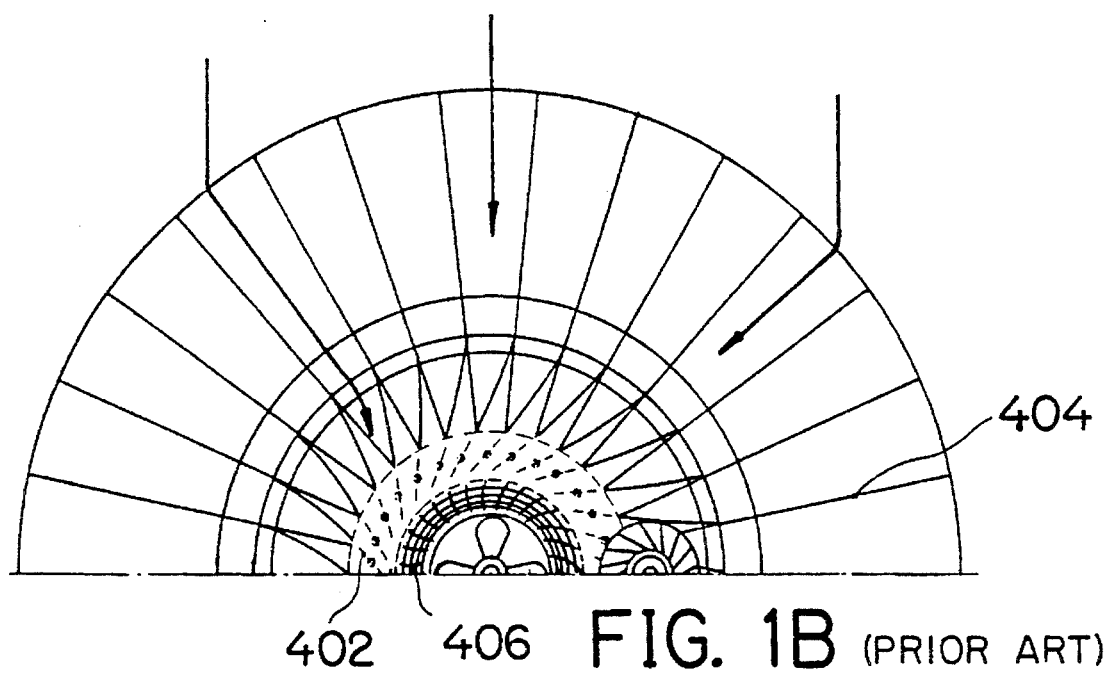
FIG. 1B is a plan view thereof with the upper portion removed.
Figure 1A:
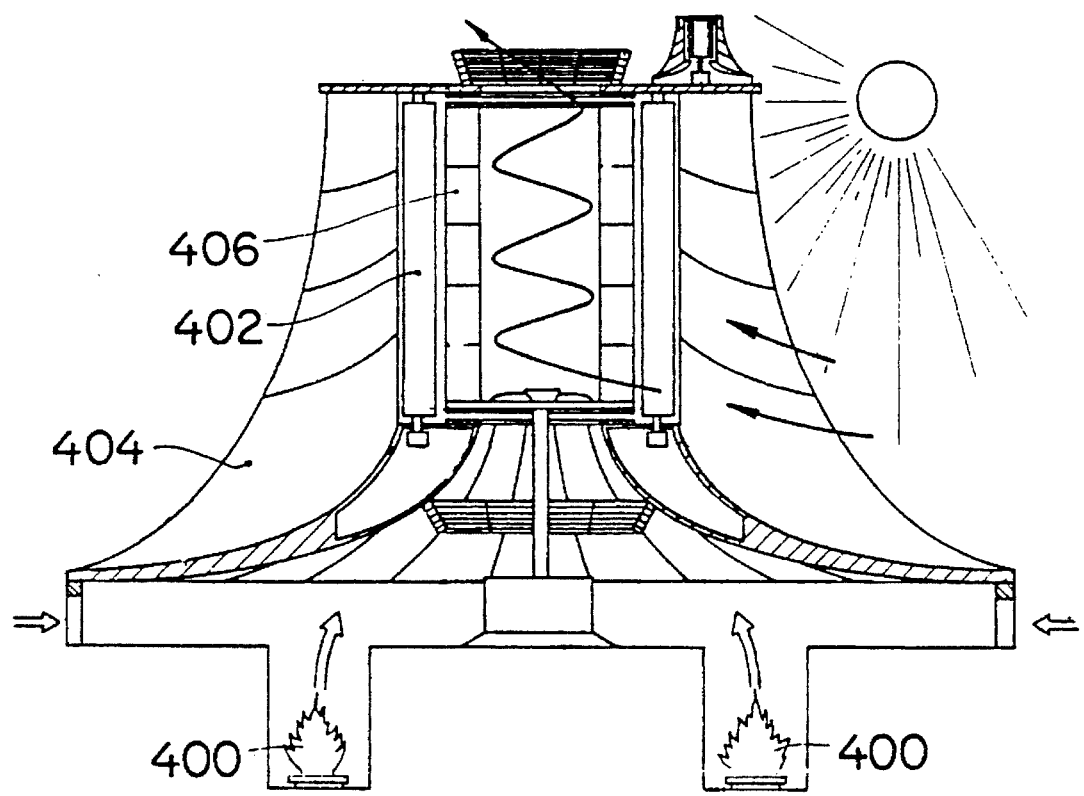
FIG. 1A is a cross sectional view of the conventional power generating tower.
Figures 2A, 2B, 2C:
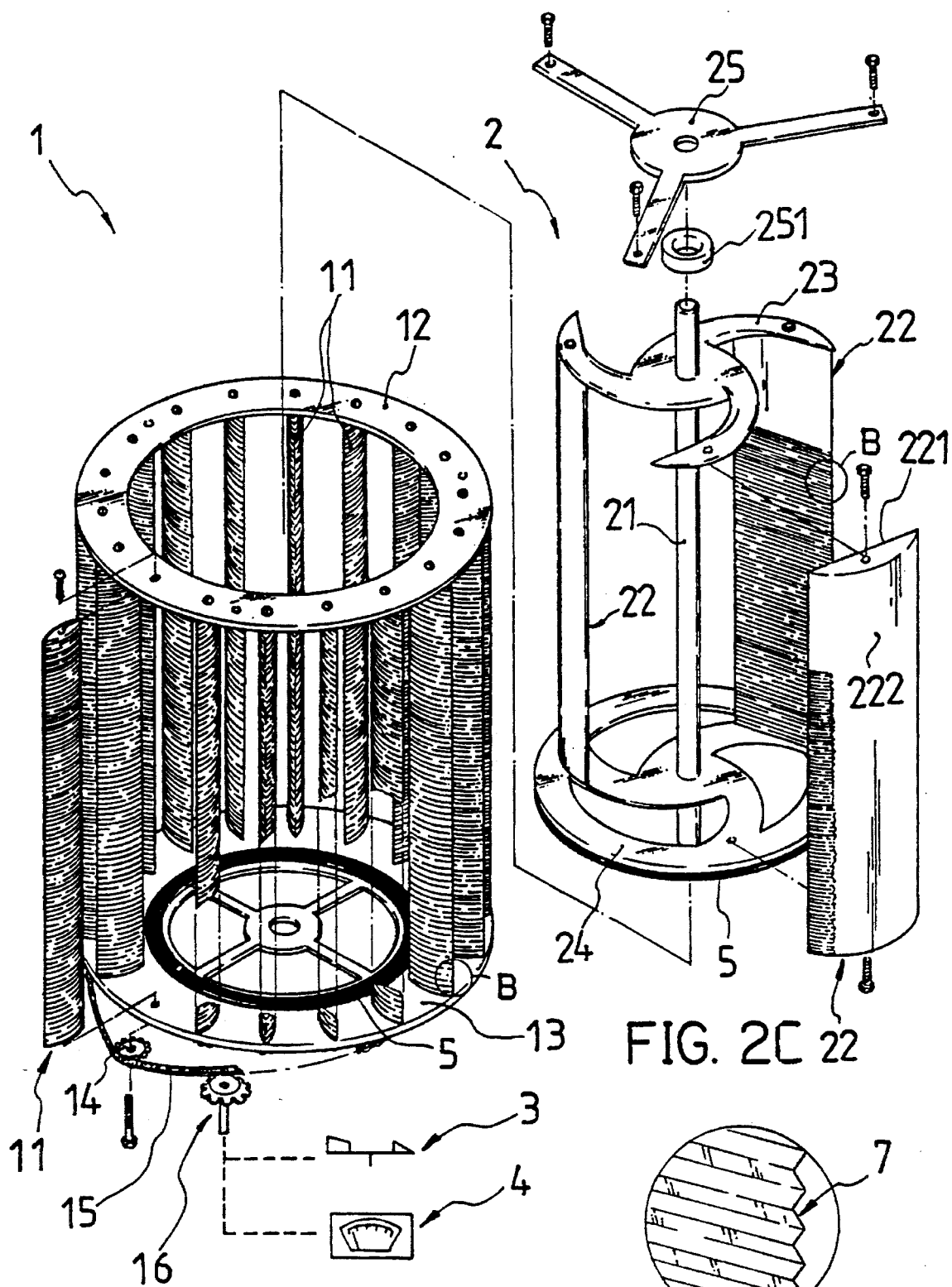
FIG. 2A is an exploded view of a preferred embodiment of the wind power machine according to the present invention.
FIG. 2B is a detailed view of detail B of FIG. 2A.
FIG. 2C is a detailed view of the rotatable inner tower.
Figure 3:
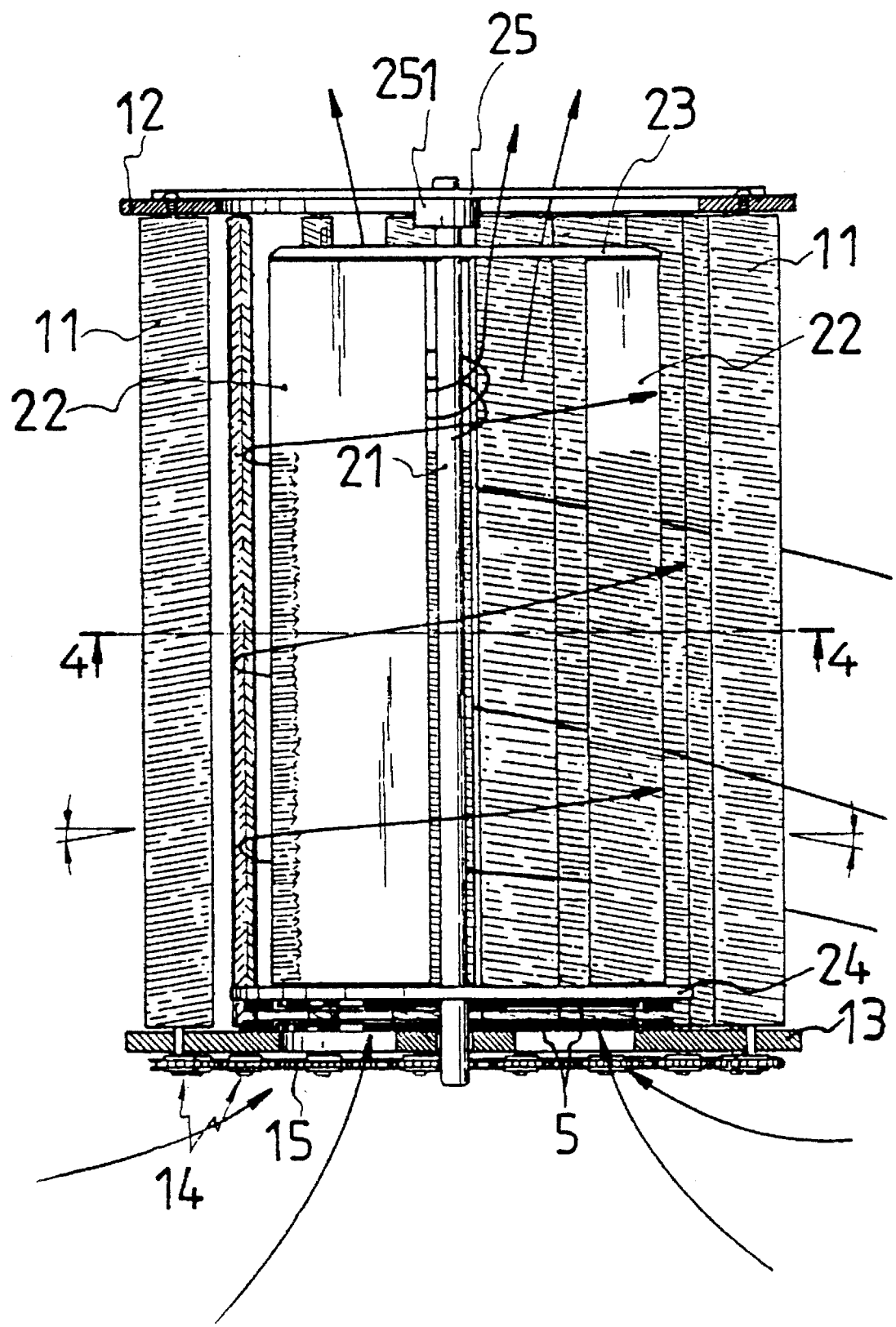
FIG. 3 is a front view of an embodiment of the wind power machine according to the present invention.
Figure 5A:
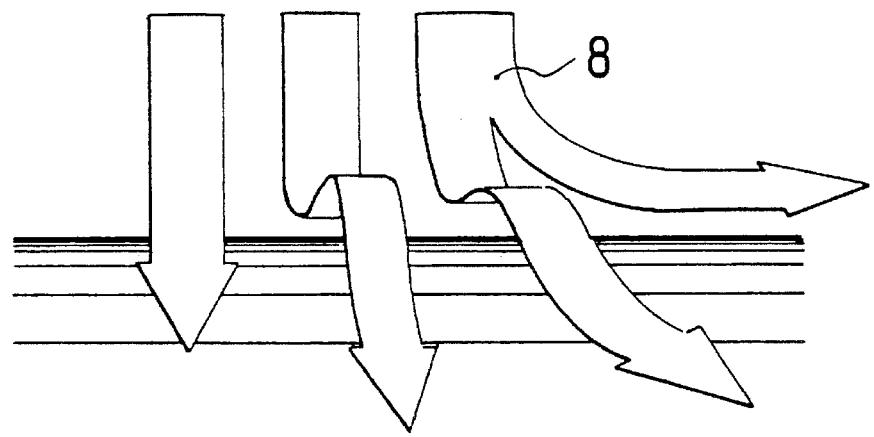
FIG. 5A is a schematic view of a flat (or a curved) surface facing the wind thereby giving the air flow in all directions.
Figure 5B:
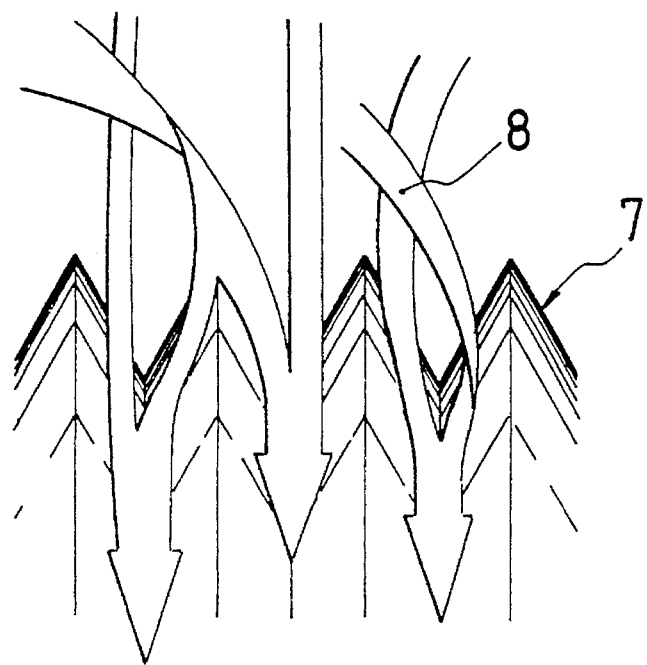
FIG. 5B is a schematic view of the V-notched surface facing the wind such that the wind force can be guided through and the pressure is increased.

Another notable feature according to the present invention is that the flow guiding plates (11), the flat surfaces (221) and the curved surfaces (222) on the external edges of the fan blades (22) are provided with V notches (7), as is shown in FIG. 2B. The V notches are provided for guiding and increasing the pressure of the air flow. The Inventor has performed experiments by using the fan blade with and without the V notch and verified that the one with the V notch (7) can actually function to guide the air flow and increase the pressure. The principle of this can be seen in FIGS. 5A and B. FIG. 5A shows a wind force (8) blowing onto the fan blade of a flat surface (or a curved surface). The wind force (8) is blowing along the surface and spreads out into all direction. FIG. 5B shows the surfaces having the V notches (7). When the wind force (8) is facing the V-notched surface of the fan blade, the wind is being guided by the V notches and follows a specific direction. In addition, since the V notch has a V-shaped cross section, therefore, the lower it goes, the smaller the volume of the cross section is available. When the wind force (8) reaches the bottom of the V-shaped cross-section, the smaller volume gives a higher air flow. Thus the fan blade can deliver a higher speed of rotation. It runs more efficiently than the fan blade with a flat (or curved) surface. By use of the flow guiding performance, the V notches (7) in the flow guiding plates (11) as well as in the fan blades (22) are provided in such a way that the notches are facing the center of the tower. Each of the notches is slanted at an angle in the upward direction, as shown in FIG. 3. Hence the air flow inside the tower has a tendency to move up and creates a whirlwind that moves around the rotatable inner tower (2) and the outer tower (1). The rotatable inner tower (2) speeds up the air flow in an upward direction. It can be seen from the figure that the V notch (7) in the fan blade (22) only occupies an appropriate portion and the notch (7) does not extend to the overall length of the fan blade (22). The reason behind this is that the Inventor has found, through experimentation, that it is easier to discharge the air flow through the top plate (12) of the outer tower (1) when the upward trend of the air flow is relieved. It is, therefore, unnecessary to guide the air flow at the discharge. Hence, the upper section of the fan blades (22) are provided with a flat (or curved) Surface instead of a V-notched surface. The air flow can thereby discharge naturally and the efficiency is also improved.

Figure 6:
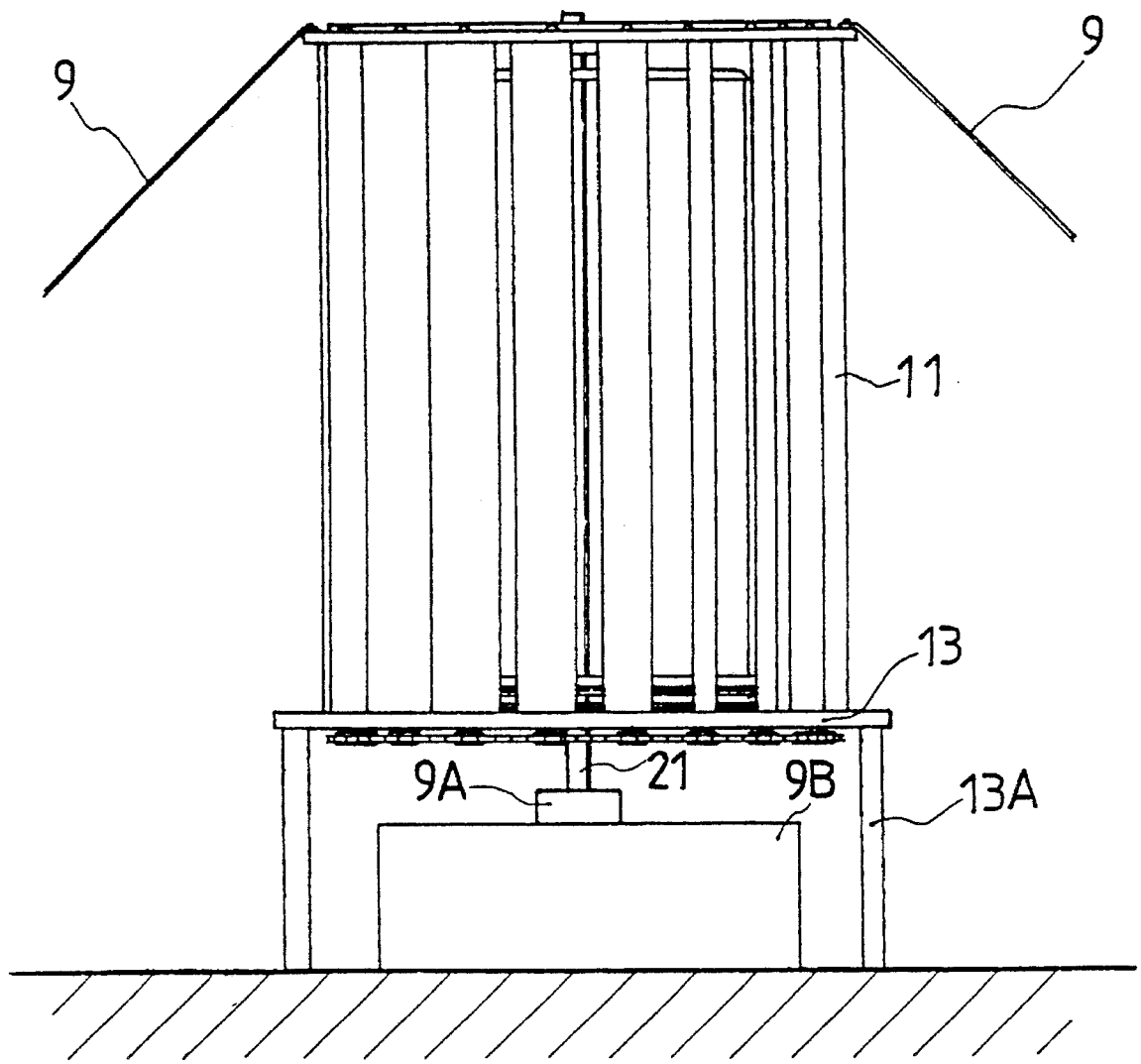
FIG. 6 is a front view of an embodiment of the wind power machine being used in power generation according to the present invention.

FIG. 6 shows an embodiment of the wind power machine being used in the generation of electricity. The wind power machine is first tied down with steel cables. The supporting shaft (21) extending from the bottom of the tower is connected to a gear box (9A) and a power generator (9B) 0 The rotation of the supporting shaft (21) is then transmitted to the gear box (9A), through which the rotational speed is converted and transmitted to the power generator (9B) for power generation. The entire tower platform in the drawing is supported at the bottom plate (13) by supporting legs (13A). The space below the bottom plate (13) is reserved for air inlet as well as a ventilation for the power generator (9B).

Figure 7B:
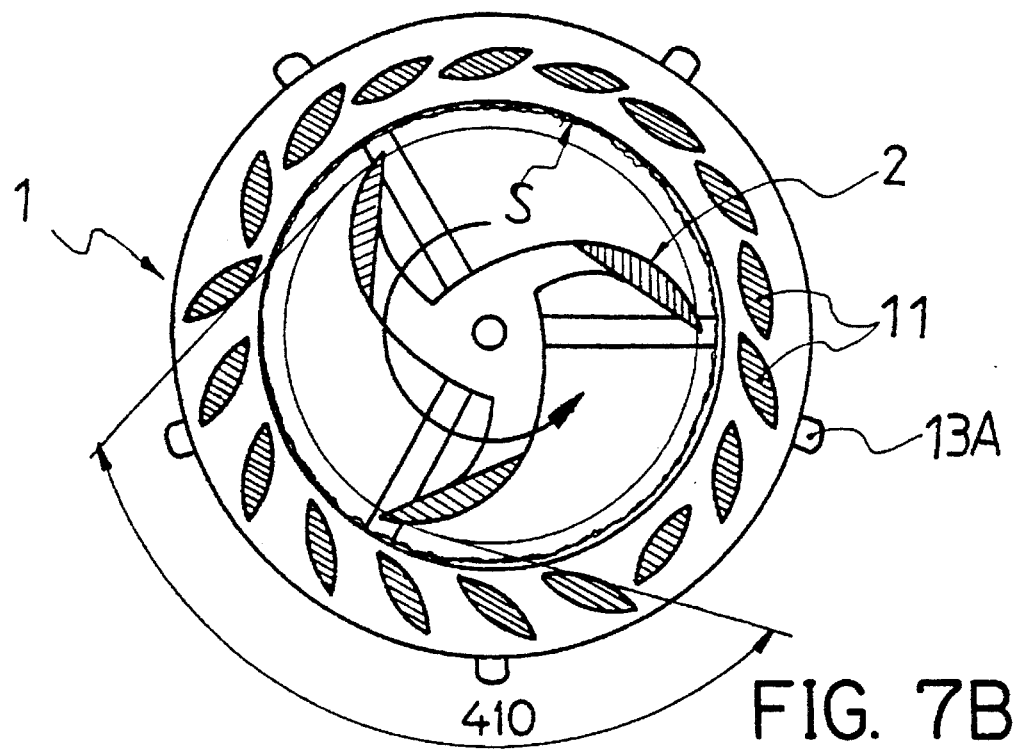
FIG. 7B is a plan view thereof with the upper portion removed.
Figure 7A:
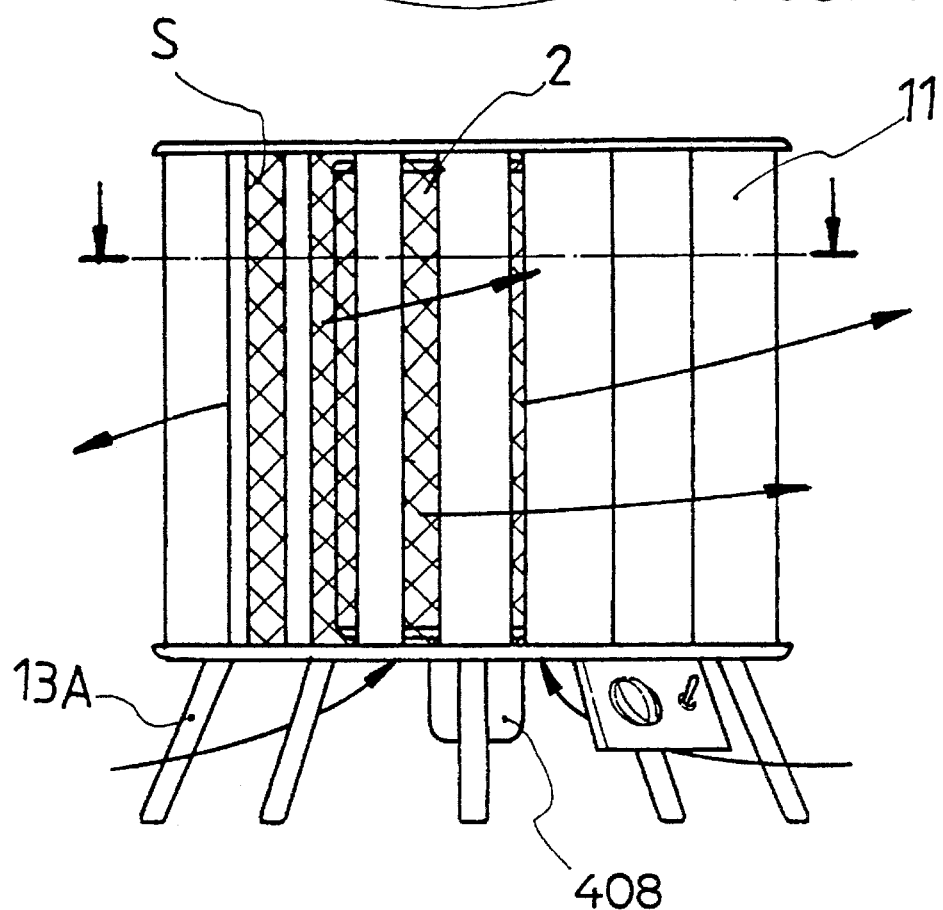
FIG. 7A is a front view of an embodiment of the wind power machine according to the present invention.

FIGS. 7A and B show another embodiment of the wind power machine which is deduced in a reversed order. The preliminary object of the wind power machine is to use the wind power to rotate the inner tower (2), the twisting momentum from the rotation is then converted into the form of mechanical energy for power generation. In this embodiment, a motor 408 is used to rotate the inner tower (2). This rotation, by theoretical reasoning, generates a wind power from the inner tower (2). This wind power is moves out in a direction tangential to the outside surface of the outer tower (1). Experiments were performed by the Inventor and the result complies with the theory. Therefore, the cool air from the inner tower (2) allows the wind power machine according to the present invention to be used as a cooling fan. Moreover, this particular cooling fan can provide a 360 degrees cooling area. In the embodiment shown in FIGS. 7A and B, the top of the outer tower (1) is sealed off and the bottom is raised up by the supporting legs (13A). The air is drawn in from the bottom of the outer tower (1). In addition, a safety shield (S) which passes air current therethrough is provided between the outer tower (1) and the rotatable inner tower (2) to assure the safety in operation. Moreover, the angles of the flow guiding plates (11) of the outer tower (1) can be adjusted such that the rearward half portions of the plates are sealed and the forward half portions of the plates are fixed in tangential directions. By such configuration, the air flow 410 discharged from the tower can be controlled. Therefore, the wind power machine according to the present invention not only provides air flow in 360 degrees direction, but the air flow can also be adjusted accordingly. The only difference is that the partial discharge of the air flow gives a higher intensity of the wind force. In addition, the wind power machine, when used as a cooling fan, is smaller is size when compared to the one used in power generation. Therefore, the magnetic ring (5) of the wind power machine used as a cooling fan can be substituted with a bearing.

The characteristics of the wind power machine can be summarized as follows:

1. The flow guiding plates (11) in the outer tower (1) are adjustable according to the wind speed and its direction. Therefore, the wind power machine is not restricted in its application and its efficiency is high. The structure is not easily damaged.

2. The rotatable inner tower (2) is a magnetic-floating type, it has a minimum frictional loss during rotation and it is capable to operate continuously.

3. The flow guiding plates (11) and the fan blades (22) are provided with V notches to increase the efficiency of rotation.

4. The wind power machine according to the present invention can be used as an air blower for full cycle operation.

Although the detailed embodiments of the invention are illustrated in the drawings and previously described in detail, this invention contemplates any configuration, design and relationship of components which will function in a similar manner and which will provide the equivalent result.

What is claimed is:

1. A wind power machine for generating electricity comprising:

a hollow outer tower having a top and a bottom; and a rotatable inner tower, having a top and a bottom and mounted within the outer tower;

a plurality of air flow guiding plates surrounding the outside of the outer tower, the flow guiding plates being adapted to guide an air flow into said machine so as to rotate the inner tower, a pair of magnetic plates having the same polarity being disposed in a facing relationship between the bottom portion of the outer tower and the bottom portion of the rotatable inner tower, so that the rotatable inner tower is in a semi-floating state relative to the outer tower, said rotatable inner tower consists of a supporting shaft and at least two fan blades, each fan blade having a flat surface facing the air flow and a curved surface downstream thereof the air flow being directed against the flat surface of each blade by said guiding plates, the flow guiding plates in the outer tower and the flat surface on each fan blade defining V-shaped notches for guiding the air flow and increasing the pressure thereof.

2. A wind power machine as recited in claim 1 wherein a plurality of the flow guiding plates each mount a chain wheel at an end thereof, and a chain is provided connecting said chain wheels so that said interconnected flow guiding plates can be adjusted synchronously.

3. A wind power machine as recited in claim 2 wherein a control wheel is .provided, connected to said chain so that the interconnected flow guiding plates can be adjusted synchronously.

4. A wind power machine as recited in claim 1 wherein the magnetic plates disposed between the outer tower and the rotatable inner tower are magnetic rings having the same polarity on adjacent facing surfaces.

5. A wind power machine comprising: an outer tower, a rotatable inner tower and motor means coupled to said inner tower; a plurality of flow guiding plates provided surrounding the outer tower for guiding the direction of air flow, the rotatable inner tower being movably mounted within the outer tower and having a supporting shaft and at least two fan blades, said motor means rotating the inner tower to generate a tangential flow therefrom through the flow guiding plates, said plates being adjustable, so that the tangential air flow from the rotation of the inner tower can be discharged partially or completely in all directions.

* * * * *